United States Patent [19]

Phillips et al.

[11] Patent Number: 5,681,505
[45] Date of Patent: Oct. 28, 1997

[54] STABILIZED FOAMABLE WHEY PROTEIN COMPOSITION

[75] Inventors: Lance G. Phillips, Ithaca; Scott E. Hawks, Moravia, both of N.Y.

[73] Assignee: Cornell Research Foundation, Inc., Ithaca, N.Y.

[21] Appl. No.: 655,914

[22] Filed: May 31, 1996

Related U.S. Application Data

[63] Continuation of Ser. No. 200,429, Feb. 23, 1994, abandoned, which is a continuation-in-part of Ser. No. 90,274, Jul. 13, 1993, Pat. No. 5,580,491.

[51] Int. Cl.$^6$ .............................. B01J 13/00; A23C 21/00; A23C 21/04
[52] U.S. Cl. .................................. 252/307; 426/564
[58] Field of Search ............................ 252/307, 356; 426/564, 583

[56] References Cited

U.S. PATENT DOCUMENTS

| | | | |
|---|---|---|---|
| 4,390,450 | 6/1983 | Gibson et al. | 252/307 |
| 4,552,773 | 11/1985 | Kahn et al. | 426/564 |
| 4,572,837 | 2/1986 | Poole et al. | 426/564 |
| 5,053,219 | 10/1991 | Giddey et al. | 424/63 |
| 5,066,509 | 11/1991 | van den Hoven et al. | 426/583 |

FOREIGN PATENT DOCUMENTS

| | | |
|---|---|---|
| 1 166 576 | 5/1984 | Canada . |

OTHER PUBLICATIONS

Chemical Abstracts 119:70824w (1993).
Chemical Abstracts 118:232520c (1993).
Chemical Abstracts 117:190414t (1992).
Chemical Abstracts 115:157334c (1991).
Chemical Abstracts 115:112991y (1991).
Chemical Abstracts 108:203423m (1988).
Chemical Abstracts 102:60889f (1985).

Lupano et al., "Gelling properties of whey protein isolate: influence of calcium removal by dialysis of diafiltration at acid or neutral pH", *International Journal of Food Science and Technology*, (1992) 27 615–628.

Derwent Abstract, AN 82–16080E/09, corresponding to EP–46326–A and CA 1 166 576, (1982).

Patel et al., "Studies of Whey Protein Concentrates. 2. Foaming and Emulsifying Properties and Their Relationships with Physicochemical Properties", *J. Dairy Science*, 73:2731–2740, 1990.

Cooney, C.M., "A Study of Foam Formation by Whey Proteins", *Diss. Abstr. Int.* 1974, 36 (03), 1123B.

*Primary Examiner*—Richard D. Lovering
*Assistant Examiner*—Daniel S. Metzmaier

[57] ABSTRACT

A method of forming a foamed composition is provided comprising providing an aqueous solution of whey protein isolate or concentrate present in an amount of at least 5% by volume and having a whey protein isolate or concentrate solids content of from about 1 to 10% by weight, a water soluble calcium source in an amount of from 0.5 to 5.0% by weight, an alcohol selected from the group consisting of methanol, ethanol, and isopropanol present in said composition in an amount of from about 0.5 to 35% by volume, and a fat present in a volume ratio of fat:aqueous whey solution of from about 1:1 to about 13:1, said composition having a pH of at least 7; aerating the composition to an extent sufficient to form a foam.

7 Claims, No Drawings

STABILIZED FOAMABLE WHEY PROTEIN COMPOSITION

CROSS-REFERENCE TO RELATED APPLICATIONS

This application is a continuation of application Ser. No. 08/200,429, filed Feb. 23, 1994, now abandoned which is a continuation-in-part of U.S. patent application Ser. No. 08/090,274, filed Jul. 13, 1993, now U.S. Pat. No. 5,580,491.

BACKGROUND OF THE PRESENT INVENTION

The present invention is directed to a foamable whey protein composition.

Presently, almost five million tons of whey are produced each year in the United States as a waste product during the production of cheese. For each 100 pounds of milk consumed during the cheese production process, 90 pounds of waste liquid are produced consisting of a watery, protein-rich whey by-product. It is estimated that more than 50 percent of this whey by-product is disposed of each year as unused waste.

It has been difficult to find a commercially-acceptable use for the large amount of whey by-product which is discarded each year. Prior efforts to form useful foamed products, for example, from whey by-products have not met with much success in view of the fact that such by-products do not lend themselves to being readily foamed. Further, even if successful, such activities have been limited to non-fat containing compositions.

It would, however, be very advantageous to provide a process by which such whey by-products can be formed into a readily foamable (and protein-containing) composition, as it would be useful to both reduce the amount of whey by-product disposed of as waste each year, as well as to provide an alternative to foamable compositions formed from egg whites.

OBJECTS AND SUMMARY OF THE INVENTION

It is accordingly one object of the present invention to provide a composition which is readily formed into a stable foam comprised of a protein-based composition.

It is further an object of the present invention to provide a fat-containing protein-based composition which is readily formed into a stable foam.

It is further an object of the present invention to provide a substitution for egg-white-based compositions which are readily formed into a stable foam.

In accordance with the present invention, there is thus provided an aqueous foamable composition comprising an aqueous solution of whey protein isolate or concentrate present in an amount of at least 5% by volume and having a whey protein isolate or concentrate solids content of from about 1 to 15% by weight, and a water-soluble source of calcium in an amount of from about 0.5 to 5.0% by weight, and optionally a fat present in a volume ratio of fat:aqueous whey solution of up to about 13:1, and optionally an alcohol having from 1-3 carbon atoms, said alcohol present in an amount of from about 0.5 to 35% by volume, said composition having a pH of at least 5.0.

DETAILED DESCRIPTION OF THE PRESENT INVENTION

It has been found that a commercially-acceptable stabilized foamable composition may be prepared comprised of an aqueous solution of a whey protein isolate or whey protein concentrate, a water-soluble source of calcium, and optionally a fat or an alcohol. The presence of a calcium source enables a highly stable foamed product to be produced.

The whey protein isolate or concentrate employed in the present invention is derived from cheese whey protein. The whey protein isolate or concentrate may be obtained by any process known to those skilled in the art. For example, the whey protein concentrate may be obtained by gel filtration of cheese whey, such as a partially delactosed cheese whey. The whey protein concentrate may also be obtained by other processes such as electrodialysis, reverse osmosis and/or ultrafiltration of cheese whey or partially delactosed cheese whey. The utililization of such processes is known in the art. For instance, U.S. Pat. No. 3,547,900 discloses a gel filtration process for the production of whey protein concentrates. Optionally, the whey protein concentrate may be subjected to microfiltration to remove foam depressants which may be present prior to use in the present composition by microfiltration through a membrane of 0.22 mm size. The whey protein isolate is typically made by conventional ion exchange procedures.

The respective cheese source for the whey protein concentrate or isolate is not critical, and a variety of cheese sources are suitable. For instance, the whey protein concentrate or isolate may be derived from cheeses including but not being limited to cheddar cheese whey, Swiss cheese whey, mozarella cheese whey, and mixtures thereof.

Such cheese whey desirably contains the proteins β-lactoglobulin and/or α-lactalbumin, and/or the hydrolysis products of either β-lactoglobulin and/or α-lactalbumin, or mixtures thereof.

Whey protein isolate or concentrate is commercially available from several suppliers throughout the U.S. A suitable exemplary whey protein isolate is available from La Sueur under the designation BiPro.

The whey protein isolate or concentrate is present in the composition in an amount ranging from about 1 to about 15% whey protein solids, based on the total weight of water present in the composition.

The whey protein isolate or concentrate component is generally in the form of solids which must be rehydrated and dissolved in water to form an aqueous solution present in the composition. Such solids are preferably combined with water prior to formation of the composition, but may be dissolved in water in the presence of other previously-added components.

It has been found that a highly stabilized foam may be formed by providing for the presence in the foamable composition of a water-soluble calcium source such as a water-soluble calcium compound such as but not limited to calcium chloride or calcium carbonate. The water-soluble calcium source may be added at any time during the formation of the composition, either separately or in the form of an aqueous dispersion or solution. Preferably, the calcium source is calcium chloride. The calcium source is generally present in an amount of from 0.5 to 5.0% by weight, based on the weight of the composition.

The optional fat component of the present invention may be from a variety of sources. For instance, unsaturated triglycerides derived from vegetable sources or mineral oils may be employed with advantage. Other suitable fat components include butterfat, coconut oil, palm kernel oil as well as other fats that do not disrupt foam formation. The optional fat component is present in a volume ratio of fat:aqueous whey solution of up to 13:1.

Advantageously, the presence of the calcium source enables a stable protein-containing foam to be formed even in the absence of the optional fat component while still possessing the texture of a fat-containing foamed composition.

The optional alcohol component employed in the present invention is an alcohol having from 1–3 carbon atoms. Suitable alcohols include but are not limited to methanol, ethanol and isopropanol. The alcohol component of the present invention is generally present in an amount ranging from about 0.5 to 35% by volume based on the total volume of the foamable composition.

Additional additives, while optional, may also be added depending upon the desired end use and properties of the foamed composition. Such additional additives include but are not limited to fragrances, stabilizers, antibacterial compounds, sugars, coloring agents, etc. For instance, as the foamed composition may be used as a dessert topping, flavors and sweeteners will be present with advantage. As the foamed composition may also be used to form a shaving cream, cosmetic additives suitable for use in such compositions may be added as appropriate. Such additional additives are added to the foamable composition in those amounts (generally minor) employed in such compositions and sufficient to provide the desired effect.

The foamable composition of the present invention may be made by simply admixing the respective components together in the presence of water until all solids are dissolved to form a foamable aqueous composition. Such admixing is undertaken under conditions of low or minimal shear in order to avoid premature foam formation. Once the aqueous solution of whey protein isolate or concentrate, the calcium source, and the optional fat and alcohol components are combined to form an admixture (together with any optional additives), the pH of the resulting composition may be adjusted as required to be at least about 5 and preferably at least 7, by addition of suitable pH modifying agent. Suitable pH modifying agents are known to those skilled in the art and include but are not limited to various phosphate buffers, sodium hydroxide and other bases. The thus-formed composition contains at least 5% by volume water, with the ultimate percentage of water which is present varying depending upon the amount of other components such as fats or oils which are added. Once formed, a foam may readily be produced by using a suitable mixing device, sparging device or other aeration means.

It has been found that at a pH of at least 7, the composition will yield a foamed product almost instantaneously upon application of shear forces to the composition, and may exhibit enhanced physical properties in comparison to the properties of foams prepared from compositions having a lower pH. This is indeed a surprising result, especially when a fat is present in the composition, as a stable foam may be produced even in the presence of large amounts of fat. It has been generally the experience of those skilled in the art that it is difficult, if not impossible, to form a fat-containing protein-based composition which is susceptible to forming a stable foam. By the present invention, both by combination of the pH and the water-soluble calcium source, it has been found that not only may a foam be readily produced, but that a foam may be formed despite a major amount of fat being present in the composition. Advantageously, the calcium component inhibits the activity of foam depressants normally found in whey products. That is, a non-microfiltered whey protein composition that would normally resist foaming will readily foam in the presence of a water-soluble calcium source.

The present invention is illustrated by the following examples which are not intended to be limiting but merely exemplary of the scope of the invention.

EXAMPLE 1

Samples of a foamable composition were prepared by admixing a whey protein isolate that was not microfiltered (5% solids) to yield an admixture (100 ml) having a pH of 7. To these samples were added separate (100 ml) portions of vegetable and mineral oil as a fat source. An aqueous solution of calcium chloride (2%) was also added at this point to the samples. Each sample was whipped for 5 min. in a Sunbeam mixer at high speed to form a foam. The overrun and visual characteristics of the foam were determined and are summarized in Table 1 below:

TABLE 1

| pH | Calcium Chloride (%) | Vol. Ratio Fat:Aqueous Whey Soln. | Overrun (%) | Visual Check of Foam Stability |
|---|---|---|---|---|
| 7 | 2 | 0 | 823 | consistency of shaving cream |
| 7 | 2 | 1:1 | 470 | same |
| 7 | 2 | 4:1 | 140 | consistency of hand cream |

EXAMPLE 2

Samples of a foamable composition were prepared by admixing a whey protein concentrate (35% protein) that was not microfiltered (15% solids) to yield an admixture (100 ml) having a pH of 7. To these samples were optionally added separate 100 ml portions of vegetable or mineral oil as a fat source. An aqueous solution of calcium chloride (varied concentrations) was also added at this point to the samples. Each sample was whipped for 5 min. in a Sunbeam mixer at high speed to form a foam. The overrun and visual characteristics of the foam were determined and were summarized in Table 2 below:

TABLE 2

| pH | Calcium Chloride (%) | Vol. Ratio Fat:Aqueous Whey Soln. | Overrun (%) | Visual Check of Foam Stability |
|---|---|---|---|---|
| 7 | 0 | 0 | 400 | very unstable |
| 7 | 0.25 | 0 | 412 | unstable |
| 7 | 0.50 | 0 | 760 | stable, consistency of shaving cream |
| 7 | 1.0 | 0 | 765 | same |
| 7 | 2.0 | 0 | 770 | same |
| 7 | 2.0 | 1:1 | 350 | same |
| 7 | 2.0 | 4:1 | 100 | consistency of hand cream |

What is claimed is:

1. A method of forming a foamed composition comprising providing an aqueous solution of whey protein isolate or concentrate present in an amount of at least 5% by volume and having a whey protein isolate or concentrate solids content of from about 1 to 15% by weight based on the total weight of water present in the composition, a water-soluble calcium source in an amount of from 0.5 to 5.0% by weight, an alcohol selected from the group consisting of methanol, ethanol and isopropanol in an amount of from 0.5 to 35% by volume, and a fat present in a volume ratio of fat:aqueous whey solution of from 1:1 to about 13:1, said composition having a pH of at least about 7, and aerating said composition to an extent sufficient to form a foam.

2. The method of claim 1 wherein said composition comprises a whey protein isolate.

3. The method of claim 1 wherein said composition comprises a whey protein concentrate.

4. The method of claim 1 wherein said fat comprises an unsaturated triglyceride derived from a vegetable source.

5. The method of claim 1 wherein said whey protein isolate or concentrate is derived from a cheese whey selected from the group consisting of cheddar cheese whey, Swiss cheese whey, mozarella cheese whey, and mixtures-thereof.

6. The method of claim 1 wherein said calcium source is selected from the group consisting of calcium chloride and calcium carbonate.

7. The method of claim 1 wherein said calcium source is calcium chloride.

* * * * *